United States Patent [19]

Agapiou

[11] Patent Number: 4,981,928
[45] Date of Patent: Jan. 1, 1991

[54] SUPPORTED POLYOLEFIN CATALYST FOR POLYMERIZATION OF ETHYLENE UNDER HIGH TEMPERATURES

[75] Inventor: Agapios K. Agapiou, Humble, Tex.

[73] Assignee: Exxon Research and Engineering Company, Florham Park, N.J.

[21] Appl. No.: 262,238

[22] Filed: Oct. 20, 1988

Related U.S. Application Data

[60] Continuation of Ser. No. 816,665, Jan. 7, 1986, abandoned, which is a continuation of Ser. No. 682,868, Dec. 18, 1984, abandoned, which is a division of Ser. No. 520,391, Aug. 4, 1983, Pat. No. 4,508,844.

[51] Int. Cl.$^5$ .................... C08F 4/654; C08F 10/02
[52] U.S. Cl. .................... 526/116; 526/125; 526/348.6; 526/352; 526/904; 526/906
[58] Field of Search .................... 526/119, 125

[56] References Cited

U.S. PATENT DOCUMENTS

| | | | |
|---|---|---|---|
| 4,069,169 | 1/1978 | Togoda et al. | 526/125 |
| 4,157,435 | 6/1979 | Toyota et al. | 526/125 |
| 4,314,911 | 2/1982 | Giannini et al. | 526/125 |
| 4,321,345 | 3/1982 | Sato et al. | 526/116 |
| 4,325,836 | 4/1982 | Epstein | 526/125 |
| 4,450,242 | 5/1984 | Mink | 526/125 |
| 4,461,846 | 7/1984 | Harris et al. | 526/125 |

FOREIGN PATENT DOCUMENTS 2057468  4/1981  United Kingdom ............ 526/125

*Primary Examiner*—Edward J. Smith
*Attorney, Agent, or Firm*—M. B. Kurtzman; B. C. Cadenhead; T. D. Simmons

[57] ABSTRACT

A catalyst component useful for (co)polymerizing ethylene under high temperatures and pressures comprising the reaction product obtained by treating a magnesium halide supported titanium halide precursor with Lewis acid, thoroughly washing the solid reaction product therefrom and prepolymerizing the washed solid product with an alpha-olefin having from 4–12 carbon atoms.

13 Claims, No Drawings

SUPPORTED POLYOLEFIN CATALYST FOR POLYMERIZATION OF ETHYLENE UNDER HIGH TEMPERATURES

RELATED APPLICATION

This application is a Continuation of U.S. Ser. No. 06/816,665 filed Jan. 7, 1986, entitled "Supported Polyolefin Catalyst for Polymerization of Ethylene Under High Temperatures," now abandoned which is a Continuation of U.S. Ser. No. 682,868, filed Dec. 18, 1984, now abandoned which is a Division of U.S. Ser. No. 520,391, filed Aug. 4, 1983, now U.S. Pat. No. 4,508,844.

BACKGROUND OF THE INVENTION

The present invention relates to a supported catalyst useful for the (co)-polymerization of olefins and particularly ethylene under high temperatures and pressures and to the process of (co)-polymerizing olefins and particularly ethylene in the presence of the supported catalyst.

The present invention especially relates to the polymerization of ethylene in the presence of the improved supported catalyst at temperatures higher than 125° C. without the need for deashing.

The polymerization of ethylene at high pressure (1000–3000 bar) and high temperature (150–340° C.) in the presence of a peroxide initiation capable of producing free radicals, has been known and used commercially for many years.

A process to polymerize ethylene at a relatively low temperature (70–100° C.) and low pressure, not greater than 35 bar, by using a catalyst of the Ziegler-type, such as, for example, titanium trichloride and an alkyl aluminum compound, has also been known and used commercially for many years.

More recently, catalyst components comprising magnesium chloride supported titanium tetrachloride have been found to be highly useful for polmerization of olefins.

Many of these prior art high-efficiency Ziegler catalysts as described in the plethora of patent literature, have high productivities at a temperature range between 60 and 100° C. However, such high efficiency Ziegler catalysts normally rapidly decay at polymerization temperatures higher than 100° C., making them unsuitable for use under high pressure—high temperature conditions. Furthermore, these catalysts present a pumpability problem in high pressure systems as a result of their large particle size.

Recently, a number of patents directed towards the polymerization of olefins under high temperatures and pressures have been published. Typical of the patents are U.S. Pat. No. 3,969,332 and British No. 1,441,115, each assigned to Ethylene Plastique and U.S. Pat. No. 4,263,170, U.K. Patent application No. 2,002,399 A and European Patent application No. 0070749 Al. Each of the catalysts disclosed in these patents, although useful for the polymerization at high temperatures, evidence some disadvantages, such as, for example, the large size of the catalyst particles. Large catalyst size is a disadvantage with respect to pumping ease and settling problems at high temperature-pressure polymerizations. Another disadvantage of some of the catalysts disclosed in the above patents is that the catalytic activity is poor, requiring removal of catalyst residues from the resulting polymer.

It would be advantageous to develop a catalyst which can be usefully employed for the production of high density polyethylene or linear low density polyethylene under high temperatures and high pressures, which catalyst would combine the properties of high activity, thereby eliminating the need for deashing the polymer product, a short half-life of about less than 2 minutes, thereby eliminating or reducing the need for quenching agents as the polymer product egresses from the reactor, and the average particle size of the catalyst is approximately 5 microns, thereby facilitating catalyst pumping without settling problems at high pressures and without damaging pump seals.

Recently, a catalyst component useful for the polymerization of propylene and alpha-olefins under Ziegler-type conventional polymerization conditions i.e., at temperatures less than about 100 ° C., and at conventional pressures have been described in Dart Industries, Inc. U.S. Pat. No. 4,347,158. The catalyst described therein comprises a support base which is milled with an inorganic Lewis acid and electron donors and combined with an active transition metal compound.

SUMMARY OF THE INVENTION

The catalyst component and catalyst system of the present invention overcome many of the disadvantages of the prior art catalysts, such as those described, for example, in the above discussed art. The present invention provides a supported high efficiency catalyst component and catalyst system for use in (co)polymerization of olefins, particularly alpha-olefins and especially ethylene, at high temperatures and pressures. The catalyst component and system of this invention contain the following important advantages: the activity of the starting catalysts is increased three-fold or more thereby eliminating the need of deashing polymer product, the half-life of the catalyst is significantly short such that after two minutes residence time, the catalyst activity is reduced to about 10 percent of its original activity, thereby eliminating or reducing the need for quenching agents; the average particle size of the catalyst is approximately 5 micrometers, thereby facilitating catalyst pumping and reducing settling problems which normally occur with the Ziegler catalysts slurries at high pressures.

To achieve these objects in accordance with the purposes of this invention as broadly described herein there is provided a catalyst component produced by the method of:

(a) co-comminuting a support base, acid and at least one organic electron donor to form a catalyst component support, said support base selected from Group IIa and IIIa (56th Edition of Handbook of Chemistry and Physics, CRC (1975)) salts and salts of the multivalent metals of the first transition series with the exception of copper, and (b) co-comminuting said catalyst component support with a transition metal compound of a Group IVb–VIb metal, to provide a catalyst precursor, contacting said catalyst precursor with a transition metal halide or oxyhalides of a Group IVb–Vb metal, washing the contacted product with an inert hydrocarbon diluent and prepolymerizing the washed product with an alpha-olefin having from 4 to 12 carbon atoms in the presence of an alkyl metal compound of the Group IIa and IIIa Metal, whereby an improved catalyst component is obtained for the polymerization or copolymerization of ethylene with a higher alpha-olefin having from 3 to 12 carbon atoms under a pressure of from 30 to 3000 and preferably about 500 to about 3,000 bar at a temperature from about 130° C. to 350° C., preferably 150–300° C.

There is further provided a highly efficient catalyst system for the polymerization of ethylene and copolymerization of ethylene with alpha-olefins, said catalyst system comprising the improved catalyst component of this invention and an organometallic cocatalyst. The organometallic cocatalyst is preferably an organoaluminum compound, such as trialkyl aluminums, tetra-alkyl alumoxanes, alkyl siloxalanes, alkyl aluminum halides and alkyl aluminum hydrides. However, organometallic cocatalysts wherein the metal is from Groups IIa and IIIa of the Periodic Table can be usefully employed. The most preferred cocatalyst is tetraisobutyl alumoxane.

The catalyst systems of the present invention as described above can be usefully employed for the polymerization of ethylene and copolymerization with high alpha-olefins at temperatures in the range from about 130 to about 350° C. and pressures of from about 300 to about 3,000 bar.

The polymerization can be performed in accordance with a variety of techniques known for carrying out polymerization and/or copolymerization of ethylene under high temperatures and pressures. Thus, for example, it is possible to employ homogeneous stirred reactors; one can employ a single tubular reactor wherein the reaction conditions are uniform, or one can employ tubular reactors having a plurality of reaction zones at different temperatures, or one can employ several consecutive reactors in series. In general a reactor used for the high pressure radical polymerization of ethylene can be utilized. Specific examples are the autoclaves and the continuous tubular reactors.

The preferred precursor to the improved catalyst component of this invention is known in the art, its ingredients and methods of preparation being fully described in Malcolm J. Kaus et al U.S. Pat. No.4,347,158 issued Aug. 31, 1982. This patent is incorporated herein in its entirety by reference, the precursor catalyst component described therein comprises a support material, such as magnesium chloride, which has been ball-milled with an inorganic Lewis acid, such as aluminum trichloride, and an electron donor, such as ethyl benzoate. These ingredients are then ball-milled with an active transition metal compound, such as titanium tetrachloride and optionally a second electron donor to form the precursor catalyst component of the invention. Although the precursor described in the above patent is effective, other precursors consisting of a combination of metal halide, such as $MgCl_2$, an electron donating substance, such as ether and transition metal halide, such as $TiCl_4$ all ball-milled, are equally effective.

The improved catalyst component of the present invention evidences productivities of at least about 30 kilograms of polymer per gram of titanium and half-lives of about 20 to about 30 seconds when tested at 230° C. and 30 bar ethylene pressure. Correspondingly, the productivity was 500 kgPE/gTi at 230° C. and 1000 bar pressure. The starting precursor catalyst gave only 8 kgPE/gTi at 230° C. and 30 bar pressure. Therefore, as a result of the present invention improvements, a 275% increase in productivity was accomplished. Furthermore, the improved catalyst components of this invention evidences substantially no settling after two hours upon shaking up a 5 or 10 weight percent slurry comprising the catalyst and hydrocarbon diluent. The catalyst particle size is reduced with the treatments of the present invention from the original average of 100 micron to an average of less than 5 micron, making it easy to pump at high pressures.

In accordance with this invention, one can usefully polymerize ethylene to high-density polyethylene or linear low-density polyethylene by copolymerizing ethylene with a minor amount of a higher alpha-olefin, such as butene-1. Furthermore, one can homopolymerize olefins having from 3 to 12 carbon atoms. However, it is preferable to copolymerize ethylene to linear low-density polyethylene. The catalyst system can also be readily employed to provide random copolymers of ethylene with alpha-olefins having from about 3 to 16 carbon atoms, and to provide elastomers of ethylene-diene polymers and the like.

DETAILED DESCRIPTION OF THE INVENTION

The supported highly efficient catalyst component of the present invention comprise, for example, the reaction product obtained by treating a magnesium chloride supported titanium tetrachloride compound with titanium tetrachloride or vanadium tetrachloride, washing the product therefrom and prepolymerizing.

The support base is selected from the group consisting of the Group IIa and IIIa metal salts and salts of the multivalent metals of the first transition series. The magnesium and manganese salts are preferably employed. The magnesium and manganese dihalides, alkyl oxides, aryl oxides and combinations thereof can be usefully employed to form the support basis. Preferred support bases are the magnesium dialkoxides, halo magnesium alkoxides and magnesium dihalides. Illustrative but nonlimiting examples of the support bases include $MgCl_2$, $MgBr_2$, $Mg(OCH_3)_2$, $Mg(OCH_2CH_3)_2$, $Mg(OC_6H_5)_2$ and combinations therefore. In accordance with the preferred embodiments of this invention, the magnesium halides and especially magnesium dichloride are employed to form the support material.

The support material is optionally contacted with a Lewis acid and an electron donor. The inorganic Lewis acids are preferably selected from the group consisting of Group IIIa halides, phosphorus trichloride and phosphorus oxytrichloride. In the preferred embodiment aluminum trichloride comprises the Lewis acid. The preferred molar ratio of support base to Lewis acid, especially magnesium chloride to aluminum chloride, is about 8 to 0.5–3.0 and especially 8 to 1–1.5.

The electron donor can be selected from organic compounds containing at least one atom of oxygen, sulfur, nitrogen, or phosphorus. Examples of such electron donors are ethers, esters, ketones, aldehydes, alcohols, carboxylic acids, phenols, thioethers, thioesters, thioketones, amines, amides, nitriles, isocyanates and phosphines. Preferably, aromatic ethers and esters are employed as the first electron donor. In an especially preferred embodiment of this invention, anisole is the electron donor of choice. The molar ratios of support base to electron donor is about 8 to 0.5–3.0, with about 8 to 1–1.5 being especially preferred. The molar ratio of first electron donor to Lewis acid should be about 1 to 1.

The transition metal compound can be a transition metal compound of the Group IVb–VIb metals. The preferred compound has the formula $MO_{p-}$ $(OR)_mX_{n-2p-m}$ wherein M is the Group IVb–VIb metal with a valency of n=3, 4, or 5; O is oxygen; p is 0 or 1; R is an alkyl, aryl, cycloalkyl group or substituted derivative thereof, X is a halide and n is equal to, or greater than zero and less than or equal to n. The transition metal is generally selected from the group consisting of titanium, vanadium, chromium, and zirconium. In the preferred embodiments of this invention, the transition metal is tetra-valent titanium. Illustrative examples of transition metal compounds which may be used in accordance with this invention are $TiCl_4$, $Ti(OCH_3)Cl_3$, $Ti(OCH_2CH_3)Cl_3$, $VCl_4$, $VCl_3$, $VOCl_2$, $VOCL_3$, and $VO(OCH_3)Cl_2$. In the most preferred embodiment, titanium tetrachloride is employed as the transition metal compound. The preferred molar ratio of support base to active transition metal compound, in the preferred embodiments of magnesium chloride to titanium tetrachloride, is about 8 to 0.1–1.0, more preferably about 8 to 0.4–0.6.

As described in Kaus et al, the preferred method of producing the above catalyst component (precursor with respect to the present invention) comprises the co-comminution of the ingredients under an inert atmosphere in a ball or vibration mill. The support base is initially charged into the mill. If the support base contains water which must be removed, a sufficient quantity of dehydrating agent is initially added to the support base and the resulting mixture co-comminuted at temperatures between about 0° C. and about 90° C. from about 15 minutes to about 48 hours. Preferably, this mixing is from about 6 hours to about 24 hours, optimally, for about 15 hours at temperatures between about 35° C. and about 50° C.

Although co-comminution may take place at temperatures between about 0° C. and about 90° C., the preferred mixing temperature is from about 35° C. to about 50° C. Mixing times may range from about 15 minutes to about 48 hours. Preferred mixing times are from about 12 hours to about 20 hours, optimally at about 16 hours.

Although it is preferred that all of the above steps be performed in a ball or vibration mill or similar device in the absence of a solvent, it is also possible to prepare the catalyst component by mixing the enhanced support with the active transition metal compound and, optionally, a second electron donor in an inert hydrocarbon solvent, such as heptane, toluene, and the like.

As described above, the improved catalyst component of this invention is obtained by contacting the precursor catalyst component with $TiCl_4$ or $VCl_4$. The precursor catalyst component can be contacted with neat $TiCl_4$ or $VCl_4$. The contacting, however, can also be in the presence of an inert hydrocarbon solvent, such as a heptane and the like. The amount of the transition metal halide in the hydrocarbon solvent can be anywhere from 1–100%.

Preferably, an excess of transition metal halide is employed. The contacting should be maintained for about 0.5 to about 12 hours at a temperature from about 30 to about 150° C. Preferably, the contact time will be about 1 to 4 hours at a temperature from about 75 to 100° C.

It is essential that the contacted product be washed sufficiently in an inert hydrocarbon or other suitable inert diluent in order to remove all the soluble materials from the catalyst component solid product. Preferably, therefore, the catalyst component solid product is washed two or more times in an inert solvent, such as, for example, heptane, hexane, Isopar L, toluene, chlorobenzene, $CCl_4$. The washing can be performed at room temperature or temperatures up to the solvent boiling point.

The washed solid product is thereafter contacted with an alpha-olefin having from 4 to 12 carbon atoms under conventional polymerization conditions in order to form a prepolymerized catalyst component comprising from about 5 weight percent to about 200 weight percent and especially 25 weight percent to about 50 weight percent prepolymer. Illustrative but nonlimiting examples of the alpha-olefins which can usefully be employed to form the prepolymer of this invention are hexane-1, octene-1, nonene-1, decene, undecene, dodecene and the like.

The prepolymerization is performed in the presence of a cocatalyst of an organometallic compound. The cocatalyst employed in the prepolymerization can be the same or different from the cocatalyst employed in the actual polymerization. Preferably, an organometallic cocatalyst is employed in the formation of the prepolymer, such as, for example, tri-n-hexyl aluminum, trimethyl aluminum, triethyl aluminum, diethylaluminum chloride and the like. Other organometallic cocatalysts can be employed in formation of the prepolymer, such as, for example, alkyl aluminums, alkyl aluminum halides, and the alkyl aluminum hydrides. The molar ratio of organometallic cocatalysts to titanium containing precursor catalyst component in the formation of the prepolymerized improved catalyst component of the invention is preferably 1 to about 8 moles of organoaluminum component per mole of titanium in the precursor catalyst component.

The prepolymerization is preferably performed in the slurry phase, hence, the precursor catalyst component is added to an inert hydrocarbon solvent, such as hexane and the like. To the slurry is added the organoaluminum cocatalyst in an inert solvent which can be the same or different from that in which the precursor catalyst is contained. The polymerizable alpha-olefin is thereafter added to the slurry and the mixture is stirred for 1 hour to 24 hours, preferably for 1–3 hours, at a temperature from 10–200° C., preferably 25–60° C.

The prepolymerized catalyst component obtained will average a particle size of about 5 micrometers. Since it is difficult to filter and dry the prepolymerized catalyst, it is preferable to adjust the concentration of the slurry before or after prepolymerization by adding the desired amount of hydrocarbon and discharge the catalyst from the reactor as such.

The catalyst component of this invention is contacted with an organometallic cocatalyst and, as described, the cocatalyst can be a Group IIa or IIIa organometallic compound, preferably, the organometallic cocatalyst is selected from the group consisting of alkyl aluminums, alkyl aluminum halides, and alkyl aluminum hydrides and alumoxanes. The preferred cocatalyst is triethyl aluminum, tri-isobutyl aluminum, diethyl aluminum chloride, tri-n-hexyl aluminum and alumoxanes. Preferably, tri-n-hexyl aluminum and tetraisobutyl alumoxane are preferred with tetraisobutyl alumoxane being the cocatalyst of choice. The molar ratio of aluminum in the cocatalyst to the titanium present in the catalyst component of this invention is preferably in the range of about 10 to about 100 and especially about 15 to about 50.

The following examples illustrating certain embodiments of the present invention are intended only to illustrate the invention and are not to be construed in any limiting sense.

EXAMPLES

Example 1 i. TiCl$_4$ treatment of MgCl$_2$/TiCl$_4$ precursor.

Twenty (20) grams of Purechem G700 magnesium supported titanium tetrachloride (MgCl$_2$/TiCl$_4$) containing 1.8 weight percent titanium (Catalyst A) and 75 ml TiCl$_4$ were charged into a 125 ml reaction vessel under nitrogen atmosphere. The reaction vessel was sealed and the mixture was stirred at 80-85° C. for 3 hours. The slurry was then filtered, washed five times with 75 ml of purified hexane and dried under vacuum (Catalyst B).

ii. Prepolymerization of Catalyst B

Under an inert atmosphere, 3 g of Catalyst B was weighed into a 125 ml flask containing 50 ml of purified hexane. 1.94 ml of a 24.8 weight percent tri-n-hexylaluminum solution in heptane was added slowly followed by the addition of 1.0 ml of octene-1. The mixture was stirred for one hour at room temperature, filtered and the catalyst dried under vacuum (Catalyst C). The particle size of the catalyst averaged 5 micrometers. The weight percent prepolymer was 35 percent based on the amount of starting catalyst.

iii. Ethylene Polymerization 500 ml of dry and degassed Isopar L (C$_{12}$ hydrocarbon) was metered into a 1-liter stirred stainless steel reactor operated in a semi-batch mode and brought up to 230° C. The reactor was pressurized with ethylene to a total pressure of 30 bar and the temperature was allowed to stabilize. 0.21 mmole of cocatalyst was introduced followed by 0.020 grams of Catalyst C via high pressure Argon injectors. Ethylene was continuously monitored so as to maintain a pressure of 30 bar. Polymerization time was 2 minutes. The results are summarized in Table I.

Example 1a - Comparative

Ethylene was polymerized under identical conditions as in Example 1, except that Catalyst A was employed in place of Catalyst C. The results of the polymerization is summarized in Table I.

Example 1b - Comparative

Ethylene was polymerized under identical conditions as in Example 1, except that Catalyst B was substituted for Catalyst C. The results of the polymerization is summarized in Table I.

As shown in Table I, Catalyst C, prepared in accordance with the invention, evidences greater productivity than either Catalyst A or B.

Example 2 and Comparative 2b i. VCl$_4$ Treatment of MgCl$_2$/TiCl$_4$ Precursor 5 g of Purechem G700 catalyst (Catalyst A), 30 ml of dried and degassed hexane and 0.5 g of VCl$_4$, representing 10 percent by weight based on the starting material, were stirred for 3 hours at 80-85° C. The reaction mixture was filtered under nitrogen and washed once with 30 ml of hexane then dried (Catalyst D).

ii. Prepolymerization of Catalyst D 1.0 g of Catalyst D, 22.6 ml of hexane and 1.37 ml of 25 weight percent TEAL solution in hexane (Al/Ti=6) were stirred at 50° C. While stirring, add 0.5 ml of octene-1 and continue stirring for 1 hour at 50° C. (Catalyst E).

iii. Ethylene Polymerization

Ethylene was polymerized under similar conditions as in Example 1, except that TIBAO was used as the cocatalyst (Al/Ti=44 mole) in combination with Catalyst E. The polymerization temperature was 220° C. In Comparative Example 2b Catalyst D was substituted for Catalyst E.

TABLE I

| Example | Cat. | Cocat. | Pressure (Bar) | Temp. (°C.) | Productivity (KgPE/g Ti) | Half-life (Sec) |
|---|---|---|---|---|---|---|
| 1 | C | TNHAL[1] | 30 | 230 | 32.9 | 24 |
| 1a | A | TNHAL | 30 | 230 | 12.2 | 36 |
| 1b | B | TNHAL | 30 | 230 | 20.7 | 19 |
| 2b | D | TIBAO | 30 | 220 | 41 | 98 |
| 2 | E | TIBAO | 30 | 220 | 58 | 50 |
| 3 | C | TIBAO[2] | 30 | 220 | 48 | 29 |
| 4 | C | TIBAO | 30 | 250 | 21 | 13 |
| 5 | C | TNHAL | 1000 | 230 | 491 | |
| 6 | C | TNHAL | 1000 | 230 | 546 | |

[1] Tri-n-hexylaluminum
[2] Tetraisobutyldialumoxane

Examples 3 and 4

These examples demonstrate that comparable results can be obtained by employing tetraisobutyl alumoxane (TIBAO) as the cocatalyst more thermally stable than trialkyaluminum compounds.

In Example 3, 500 ml of dry degassed Isopar L was metered into a 1-liter stirred stainless steel autoclave. The temperature was brought up to 230° C. The reactor was pressurized with ethylene to a total pressure of 450 psig and the temperature was allowed to stabilize at 230° C. 0.21 mmole of TIBAO (Al/Ti=50 moles) was introduced followed by 0.020 g of Catalyst C (prepared in Example 1) via high pressure Argon injectors. Ethylene uptake was continuously monitored and the pressure maintained at 30 bar. Polymerization time was 2 minutes. The results are summarized in Table I.

In Example 4, the polymerization was identical to that of Example 3 with the exception that the polymerization temperature was maintained at 250° C. The results are summarized in Table I.

Example 5 and 6

These examples demonstrate the effect of carrying out the polymerization under higher ethylene concentration (pressure of 1000 bar as compared to the 30 bar pressure). Table I summarizes the results showing an increase in productivity with increasing monomer concentration.

Example 7 and 8

These examples demonstrate that copolymerization of ethylene and alpha-olefins can be advantageously produced in accordance with the invention to obtain linear low density polyethylene.

500 ml of dry degassed Isopar L was metered into a 1-liter stainless steel autoclave as employed in Example 1. 30 cc of butene-1 and H$_2$ (5 psig) was added and the reactor was brought up to a temperature of 220° C. The reactor was pressurized with ethylene to a total pressure of 30 bar and the temperature allowed to stabilize. 0.21 mmole TNHAL (Al/Ti=25 mole) was introduced followed by 0.020 g Catalyst C via high pressure Argon injectors. Ethylene was continuously monitored in order to maintain a pressure of 30 bar. Residence time was 2 minutes.

In Example 8, the polymerization was identical to Example 7 with the exception that butene-1 was not employed. The results as summarized in Table II demonstrate that for the same MI the density of polyethylene can be advantageously lowered by employing a comonomer, such as butene-1, during the polymerization reaction.

TABLE II

| Example | Temp. (°C.) | H$_2$ (psig) | Butene-1 (cc) | Productivity[1] (Kg PE/g Ti) | MI (dg/min) | Density (g/cc) |
|---|---|---|---|---|---|---|
| 7 | 220 | 5 | 30 | 39.6 | 3.0 | 0.936 |
| 8 | 220 | 5 | — | 42.4 | 3.0 | 0.963 |

[1] based on ethylene uptake only

Example 9 and Comparative 9a and 9b

To demonstrate the variability of precursor support systems that can be utilized, the following experiments were carried out.

Under an inert atmosphere, a vibratory ball mill having a capacity of 300 ml and containing approximately 3.0 kg, ½" diameter stainless steel balls, was charged with 5.58 g of diphenylether, 25.0 g of MgCl$_2$ and 4.37 g AlCl$_3$. The content of the mill was pulverized for 12 hours at room temperature. The mill was opened inside a glove box and 2.8 g of TiCl$_4$ was added to the content. Milling was continued for another 6 hours after which the catalyst was separated from the balls. The recovered material is labeled "Catalyst F".

10 g of Catalyst F and 35 g of TiCl$_4$ were stirred in a 50 ml sealed vial for 3 hours at 85° C. The material was filtered and washed 5 times with 30 ml of hexane after which it was dried under vacuum. The recovered material is labeled "Catalyst G".

1.0 g of Catalyst G was slurried in 30 ml of purified hexane in a 50 ml vial under an inert atmosphere. To the slurry were added 2.6 ml of a tri-n-hexylaluminum solution in hexane (0.64 m mole/cc), and 0.5 ml of degassed and dehydrated octene-1. The vial was sealed and stirred for one hour at room temperature. The above treatment resulted in a very fine particle size catalyst comprising 35 weight percent prepolymer (~5 micrometers average particle size) thus made suitable for pumping under high pressures. The catalyst slurry could not be filtered, it was therefore centrifuged and washed with hexane twice before drying it over a sweep of nitrogen. This catalyst was labeled H.

Catalysts F, G and H were each used for the polymerization of ethylene. The conditions for polymerization are identical to those of Example 1. The results of the polymerizations are summarized in Table III.

TABLE III

| Example | Cat. | Cocat. | Max. Specific Activity (KgPE/gTi-min-atm) | Productivity (KgPE/g Ti) | Half-life (Sec) |
|---|---|---|---|---|---|
| 9a | F | TNHAL | 0.04 | 3.1 | 140 |
| 9b | G | TNHAL | 0.72 | 12.2 | 18 |
| 9 | H | TNHAL | 2.06 | 30.9 | 20 |

Example 10

This example demonstrates the excellent settling properties of the catalysts prepared in accordance with this invention.

Prepolymerized catalysts were prepared as in Example 1 in order to obtain prepolymerized catalyst comprising 5 weight percent slurry and prepolymerized catalyst comprising 10 weight percent slurry in Isopar L.

In each of three 10 ml graduated cylinders A, B and C, there was added 10 ml of 5 weight percent prepolymerized TiCl$_4$ treated catalyst slurry in Isopar L, 10 weight percent of the above catalyst in Isopar L and 10 weight percent of prepolymerized Purechem G700 catalyst in Isopar L, respectively. The graduated cylinders were stoppered and violently shaken for 15 seconds. The settling rate was measured by allowing the slurries to stand undisturbed and periodically measuring the level of slurry as a percent of the original 10 ml volume. After 2 hours, the settling amounted to less than 1 percent of the original volume in Samples A and B while that in Sample C amounted to about 85 percent of the original volume.

What is claimed is:

1. In a process for the single phase (co)polymerization of ethylene at a pressure in the range of 30 bar to about 3,000 bar and at a temperature in the range of about 130 to about 350° C., the improvement comprising employing as the catalyst system,
    (A) a transitition metal containing catalyst component having a half-life of less than two minutes obtained by,
        (a) co-comminuting magnesium chloride and an organic electron donor to form a catalyst component support, the molar ratio of the support to the electron donor being in the range of about 8 to 0.5–3.0,
        (b) co-comminuting said catalyst component support with TiCl$_4$, to provide a catalyst precursor, the molar ratio of the support to TiCl$_4$ being about 8 to 0.1–1.0,
        (c) contacting said catalyst precursor with a titanium or vanadium halide neat or in hydrocarbon solution at a weight percent ratio of about 1 to 100,
        (d) washing the contacted product with an inert hydrocarbon diluent, and
        (e) prepolymerizing the washed product with an alpha-olefin having from 4 to 12 carbon atoms in the presence of an organoaluminum compound selected from alkyl aluminums, alkyl aluminum halides and alkyl aluminum hydrides, and
    (B) an alkyl aluminum compound.

2. The process in accordance with claim 1 wherein the support is magnesium dichloride and the catalyst component comprises from about 5 to about 200 weight percent of prepolymer.

3. The process of claim 2 wherein the catalyst component precursor is contacted in step (c) with titanium tetrachloride or vanadium tetrachloride for from about 0.5 to about 12 hours at a temperature of from 30° C. to about 150° C.

4. The process of claim 3 wherein a Lewis acid is co-comminuted with the support and electron donor.

5. The process of claim 4 wherein the Lewis acid is AlCl$_3$.

6. The process of claim 3 wherein the precursor is contacted with vanadium tetrachloride.

7. The process of claim 2 wherein the alpha-olefin is octene-1.

8. The process of claim 1 wherein the transition metal containing catalyst component has an average particle size of about 1 to about 30 microns.

9. The process of claim 1 wherein the alkyl aluminum compound is tri-n-hexylaluminum.

10. The process of claim 1 wherein the alkyl aluminum compound is tetraisobutyl alumoxane.

11. The process of claim 1 wherein the half-life of the catalyst is of a period of time whereby, after two minutes polymerization time, the catalyst activity is reduced to about 10% of its original activity.

12. The process of claim 4 wherein said electron donor comprises anisole and ethyl benzoate.

13. In a process for the single phase (co)polymerization of ethylene at a pressure in the range of 30 bar to about 3,000 and at a temperature in the range of about 130 to about 350° C., the improvement comprising employment as the catalyst system, (A) a titanium containing catalyst component having a half-life of less than two minutes obtained by, (a) co-comminuting magnesium dichloride and a mixture of anisole and ethyl benzoate to form a catalyst component support, the molar ratio of the magnesium dichloride to combined anisole and ethyl benzoate. being in the range of about 8 to about 0.5–3.0, (b) co-comminuting said treated catalyst component support with $TiCl_4$ to provide a catalyst component precursor, the molar ratio of the support to $TiCl_4$ being about 8 to 0.1–1.0, (c) contacting said precursor with one of vanadium tetrachloride or titanium tetrachloride neat or in hydrocarbon solution at a weight percent ratio of about 1 to 100, (d) washing the contacted product with an inert hydrocarbon diluent, (e) pre-polymerizing the washed product with octene-1 in the presence of triethylaluminum, and (B) tri-n-hexylaluminum.

* * * * *